Dec. 3, 1929.  J. ROBINSON  1,738,484

AUTOMATIC TRAIN PIPE CONNECTER

Original Filed July 15, 1922

INVENTOR
Joseph Robinson
BY
Watson, Coit, Morse & Grindle
ATTORNEYS

Patented Dec. 3, 1929

1,738,484

UNITED STATES PATENT OFFICE

JOSEPH ROBINSON, OF NEW YORK, N. Y.

AUTOMATIC TRAIN-PIPE CONNECTER

Application filed July 15, 1922, Serial No. 575,136. Renewed February 13, 1929.

My invention relates to automatic train pipe couplings, and more particularly to that type of coupling in which the fluid conduit, or conduits, are formed separately of the head and secured therein. In my co-pending application Serial Number 490,340 filed August 6th, 1921, I show such a conduit at 14, and secure the same therein by means of the pin 17. The present invention is an improvement on that construction, it having been found in service that unless a very strong spring is employed to hold the pin down it frequently works up out of contact with the conduit thus permitting the same to work out of the service position.

Figure 1:
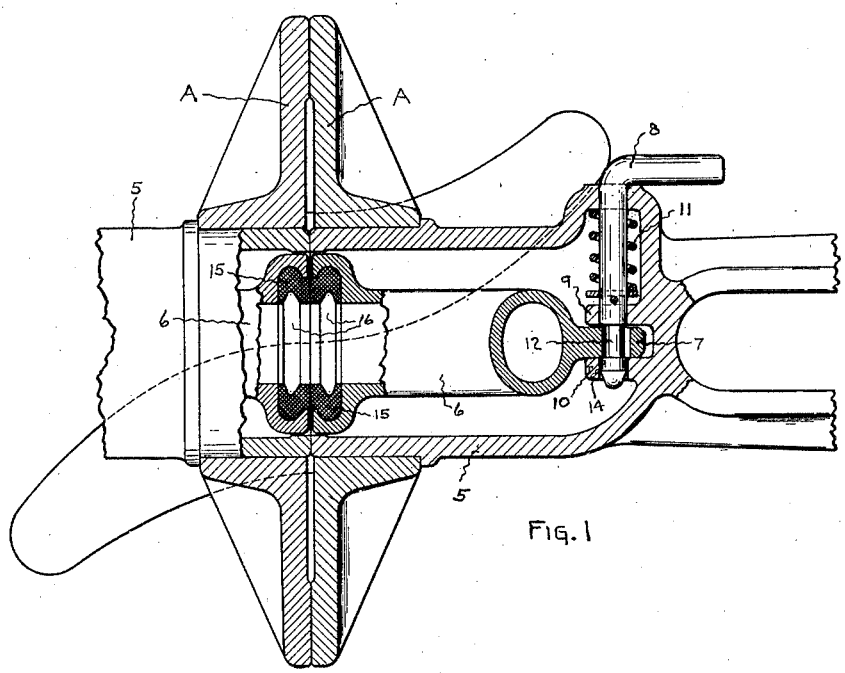
Figure 2:
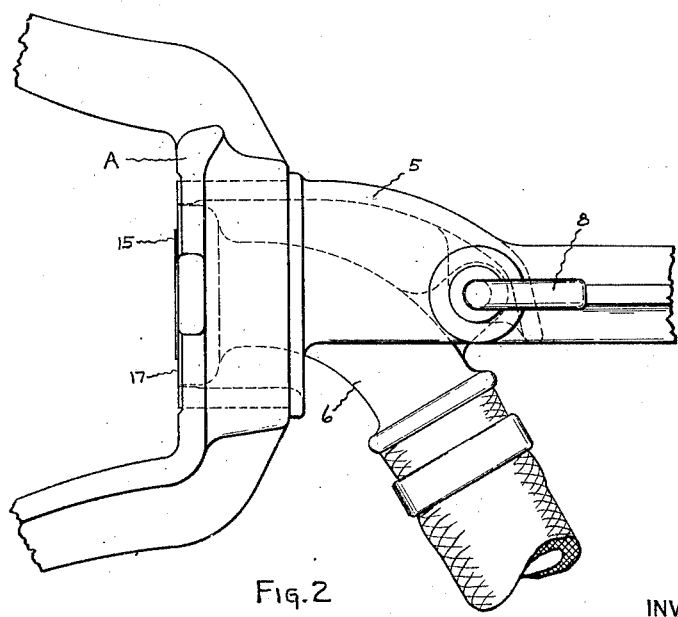

The present invention overcomes this objection, and is fully described in the following specification, pointed out in the appended claims and illustrated in the accompanying drawings in which Figure 1 is a vertical section of a pair of mated coupling heads having my improvement, and Figure 2 is a plan view of one of the heads shown in Figure 1. In this view the wings of the head are broken away in part.

Referring now to the drawings: My improvement may, of course, be used with any suitable type of coupling head A, but I prefer to use it with that type having a centrally located opening through which is pressed the forward hollow end of a pipe or shank 5, a suitable laterally diverging fitting 6 being mounted in such hollow end of the pipe and provided with a rearwardly extending lug 7 downwardly through which a pin 8 extends to removably secure the conduit 6 in the hollow end of said pipe. The lug is supported between a pair of bosses or projections 9 and 10 formed integrally with the pipe 5. A suitable spring 11 holds the pin 8 in the down or locked position as shown in Figure 1. To insure against the possibility of the pin working upward out of engagement with the lug 7 I groove or reduce the diameter of the pin as at 12, the side walls of the groove being tapered slightly as at 14 to facilitate manual extraction of the pin from the lug 7. In the forward end of the conduit 6 I mount an air extended gasket 15 such as shown in my co-pending application Serial Number 450,171, filed March 7th, 1921. The gasket is provided with an annular groove 16 into which the train pipe fluid enters and presses the gasket forward.

When two connecter heads having my improvement are coupled together, as shown in Figure 1, and the air is turned on the air enters the grooves 16 of the mating gaskets and drives the forward face of each gasket forward against the other, thus kicking or shifting the fittings 6 rearwardly, thereby carrying the lugs 7 thereof into the grooves 12 of the pin and forcing the lug rigidly against the pin at this point. In this manner the pin 8 is firmly locked against accidental disconnection from the fitting 6 while the air is admitted to the fitting. In Figure 1 my improvement is shown in the position occupied when the air is turned into the fittings 6. When there is no air in the fittings the faces of the gasket 15 rest substantially in the plane of the face 17 of the fittings 6, which allows for slight longitudinal movement of the fitting in the pipe 5 to permit ready extraction of the pin 8 when the air is not on. Immediately the air is turned on, the gaskets puff out, or are pressed forward, as aforesaid thus kicking the fitting rearwardly into the groove 12 of the pin 8, as and for the purpose afore described.

While I show my improvement applied to the central port of an automatic train pipe coupling head of the freight type, it may of course be applied to any suitable type of coupling head having one or more ports.

What I claim is:

1. In an automatic train pipe coupling, the combination of a coupling head having a hollow shank, a conduit mounted in said shank, means for removably securing the conduit in the shank, and means carried by said conduit for automatically locking said securing means in the service position.

2. In an automatic train pipe coupling, the combination of a coupling head having a hollow shank, a conduit mounted in said shank, means for removably securing the conduit in the shank, and fluid actuated means for locking said securing means in the service position.

3. In an automatic train pipe coupling, the combination of a coupling head having a shank provided with an opening, a conduit mounted in said opening, means for removably securing the conduit in the opening, said means including a boss on said shank, a lug on said conduit resting on said boss, a pin extending through the boss and lug, and a fluid actuated means for locking said pin in service position when pressure fluid is supplied to said conduit.

4. In an automatic train pipe coupling, the combination of a coupling head having a shank provided with an opening, a conduit mounted in said opening, means for removably securing the conduit in the opening, said means comprising a boss on said shank, a lug on said conduit, a part extending through a wall of said shank into said boss, said part being provided with a recess, and automatically actuating means to shift said conduit rearwardly in said opening to move said lug into said recess.

5. In an automatic train pipe coupling, the combination of a coupling head having a shank provided with an opening, a conduit mounted in said opening, means for removably securing the conduit in the opening, and fluid actuated means for positively locking said securing means in the service position in said opening.

6. In an automatic train pipe coupling, the combination of a coupling head having a shank provided with an opening, a conduit mounted in said opening, means for removably securing the conduit in the opening, said means comprising a lug on said conduit, a spring actuated part extending through a wall of said shank into said boss, said part being provided with a recess, and automatically actuating means to shift said conduit rearwardly in said opening to move said lug into said recess.

7. In an automatic train pipe coupling, the combination of a coupling head having a hollow portion connected thereto, a conduit movably mounted in said hollow portion, means for removably securing the conduit in said hollow portion, and means operated by movement of said conduit in said hollow portion for automatically locking said securing means in the service position.

8. In an automatic train pipe coupling, the combination of a coupling head having a hollow shank, a conduit mounted in said shank, a movable member for removably securing the conduit in the shank, and cooperating means on said conduit and said movable member for locking the latter in position to hold the conduit in the shank.

9. In a device of the class described, a coupling head, an air conduit removably mounted in said head and means actuated by air under pressure flowing through the conduit to a mating head for automatically moving and locking said conduit in said head.

10. In a device of the class described, a coupling head having an opening, a conduit removably mounted in said head and projecting into said opening, means actuated by air under pressure flowing through the conduit to a mating head for automatically moving said conduit rearwardly and means for automatically locking the conduit in the head upon such rearward movement of the same.

11. In a device of the class described, a coupling head having an opening therein, an air conduit mounted in said head and having its front end arranged in said opening, a locking device for engaging the rear end of said conduit, and means actuated by air under pressure flowing through the conduit to a mating head for automatically moving said conduit rearwardly to engage said locking device.

12. In a device of the class described, a coupling head having a portion provided with an opening, a conduit mounted in said opening, means for removably securing the conduit in the opening and means actuated by air under pressure flowing through the conduit to a mating head to automatically shift said conduit longitudinally in said opening and means serving to lock said conduit in position when thus shifted.

In testimony whereof I hereunto affix my signature.

JOSEPH ROBINSON.